Patented Apr. 15, 1941

2,238,275

UNITED STATES PATENT OFFICE 2,238,275

METHOD OF FLUSHING WATER WET PIGMENTS IN OIL

Thomas Anthony Martone, Wilmington, Del., assignor to E. I. du Pont de Nemours & Company, Wilmington, Del., a corporation of Delaware No Drawing. Application May 27, 1939, Serial No. 276,223

2 Claims. (Cl. 134—58)

This invention relates to a process for flushing water-wet pigments in oil, that is, transferring pigments from a water phase to an oil phase with separation of the water.

It is an object of this invention to provide a simple and efficient process for transferring pigments from a water phase in which they are highly dispersed to an oil phase, with separation of the water. A further object is the preparation of flushed inks from highly dispersed aqueous pigment pastes which ordinarily are difficult or impossible to flush. Other and further important objects of this invention will appear as the description proceeds.

The term "flushing," as used in this specification, refers to the process of transferring a pigment from an aqueous medium to an oil medium by mixing the aqueous pigment paste with oil in such a way that the pigment transfers to the oil phase, and then separating the water. The purpose of flushing is well known to those skilled in the pigment art. For the purpose of preparation of printing inks, paints, and the like, which consist essentially of solid pigment particles suspended in an oily vehicle, it is necessary to have the pigment free of water. On the other hand, the pigment should be as finely divided as possible, because otherwise the full tinctorial strength and brilliancy of the pigment can be developed in the ink or paint only after prolonged grinding, if at all. Elimination of the water by evaporation does not generally lead to the desired result, since the particles of pigment agglomerate during the process of drying into hard, coarse aggregates which disperse in the oil only with great difficulty even if given a preliminary grinding to a very fine mesh. The flushing procedure, then, has as its object to transfer the pigment from an aqueous phase into a phase which is readily miscible with oil, that is an oily phase, without agglomerating the particles in the meantime.

As generally practiced, flushing involves the stirring of an aqueous pigment paste with a large quantity of oil. The aqueous paste started with is generally of a high solids content, because of requirements for standardization. Such a concentrated paste, however, is viscous, and therefore difficult to agitate with a limited quantity of oil unless special mixing equipment is employed. On the other hand, stiff aqueous pastes can be readily converted into easy flowing pastes by admixing therewith a water-soluble dispersing agent, but it was found that such dispersed pastes are very difficult, if not impossible, to flush into oil. Evidently, the dispersing agent interferes with the wetting of the pigment particles by the oil.

Now, according to my invention concentrated aqueous pastes are flushed readily into oil by first adding to the same a water-soluble dispersing agent to increase their fluidity and then treating the same to precipitate the dispersing agent either prior to or simultaneously with the flushing treatment. I found that by proceeding in this manner it is possible to operate upon a concentrated aqueous paste and to flush the same readily with a limited quantity of oil by ordinary agitation.

Without limiting my invention to any particular procedure, the following specific example is given to illustrate my preferred mode of operation: Parts mentioned are by weight.

Example 125 parts of copper phthalocyanine paste containing 25 parts of pigment and 0.3 part naphthalene - sulfonic - acid-formaldehyde-condensation-product-sodium salt are treated with 2 parts of barium chloride in 20 parts of water. 37½ parts of lithographic varnish (#1) are added and the mass stirred for 5 minutes. By this time most of the water has separated as a clear liquid and is drawn off from the mass. 37½ parts more of lithographic varnish are stirred in and the ink is milled on a 3 roller mill. This procedure expels the rest of the water and produces an ink of excellent properties.

In a similar manner, aqueous pastes of other pigments may be flushed in oil, for instance The azo pigment obtained by diazotizing m-nitro-p-toluidine and coupling into acetoacetanilide;
The barium lake of Lithol Red (Col. Ind. #189)
The calcium lake of Lithol Red (Col. Ind. #189)
The phosphotungstic toner of Victoria Blue (Col. Ind. #729)
The phosphotungstic toner of Rhodamine B (Col. Ind. #749).

In general, any concentrated dispersed aqueous pigment composition of the type that are used in the paint, printing-ink, and textile printing arts may be employed.

Instead of flushing into lithographic-varnish, the pigment may be flushed into any other oil, for instance liquid aliphatic or aromatic hydrocarbons, vegetable, animal or mineral oils, and organic solvent solutions of synthetic resins.

In lieu of the sodium salt of naphthalene-formaldehyde-sulfonic acid condensation product, any other water-soluble dispersing agent may be employed, for instance Long-chain hydrocarbon sulfonates (Reed, Re. No. 20,968; original Patent No. 2,046,093)
Isopropyl-naphthalene-sulfonic acid and its alkali-metal salts
C-cetyl-betaine
Stearyl-trimethyl-ammonium bromide.

It should be observed here, however, that there is a distinction between a dispersing agent and an emulsifying agent. Not all dispersing agents are capable of acting as emulsifying agents and conversely, not many emulsifying agents are suitable for this invention. Emulsifying agents have been used in certain flushing processes to emulsify the aqueous paste in the oil. In my invention, I add a dispersing agent to the aqueous paste in the absence of oil, and its function is to colloidize the pigment particles in the aqueous medium and to make the entire mass more fluid without further dilution with water.

As precipitants any salt or reagent which will render the above agents insoluble in water may be employed. The following reagents have been found applicable:

Calcium chloride
Ferric chloride
Aluminum sulfate
Calcium acetate

In general, the choice of precipitant will depend on the nature of dispersing agent selected, and will be readily recognized by those skilled in the art.

The proportions of materials may be varied over wide limits without departing from the scope of the invention. The temperature, methods of milling, etc. may be varied. The water may be drawn off with vacuum if desired.

As for the theory of my invention, the fact that certain dispersing agents have the property of thinning aqueous pigment pastes is well known. How this action takes place is not definitely known. It may be due to the more thorough wetting of the pigment by water so that each pigment particle is completely surrounded by water and not touching an adjacent pigment particle. I have found that this type of pigment paste is difficult or impossible to flush into oil probably due to the inability of the oil to wet the pigment. The addition of agents which precipitate the dispersing agent from the water phase probably by chemical means, but possibly by neutralization of an electric charge permits the flushing of these pastes.

It has been observed that metal salts which will precipitate the dispersing agent in water are most effective. For instance, the barium salt of naphthalene sulfonic acid-formaldehyde condensation product is insoluble in water. The sodium salt which is soluble is used as a dispersing agent. When the dispersing agent is removed from the sphere of action by precipitation, the paste flushes normally as though no dispersing agent had been used. It is possible that the metal salt of the dispersing agent may actually assist dispersion of the pigment in oil instead of water.

It will be understood, however, that I do not wish to limit this invention to the above theory.

It will be clear from the above description that my invention contributes several important features to the art of producing flushed pigments for use in printing inks, paints, lacquers, etc. Thus, the use of a water-soluble dispersing agent permits mixing and ease of handling of high-solid pastes which would normally be too viscous to flow. The use of precipitating agents for the dispersing agent permits the use of these pigment pastes in flushing for which they would be otherwise unsuited. Flushing of pigments has the advantage of producing pigmented inks or paints without drying and grinding the pigment, and consequently without the intermediate formation of hard lumps which diminish the brilliancy and tinctorial power of the pigment and increase the labor of its dispersion in the oily vehicle. Many other advantages will be apparent to those skilled in the art.

I claim:

1. The process of converting an aqueous pigment paste into an oily pigment paste, which comprises treating an aqueous pigment paste containing a water-soluble dispersing agent, capable of increasing its fluidity without substantially diluting the same, with a water-soluble salt which is capable of forming a water-insoluble compound with the said dispersing agent and then stirring into the mass a quantity of organic water-insoluble, oily liquid sufficient to displace the water in the voids of the pigment, producing an oily paste.

2. The process of producing an organic-liquid paste of copper phthalocyanine, which comprises treating a concentrated aqueous paste of copper phthalocyanine containing the sodium salt of naphthalene-sulfonic acid-formaldehyde condensation product, with barium chloride to precipitate the said condensation product, and then stirring the mass with an organic water-insoluble, oily liquid until the water has separated leaving an oily paste.

THOMAS A. MARTONE.